United States Patent
Legrand et al.

(10) Patent No.: US 6,358,307 B1
(45) Date of Patent: Mar. 19, 2002

(54) VANADIUM DIOXIDE MICROPARTICLES, METHOD FOR PREPARING SAME, AND USE THEREOF, IN PARTICULAR FOR SURFACE COATING

(75) Inventors: Pierre Legrand, Puyricard; Jean-Raymond Gavarri, Garde; Jean-Christophe Valmalette, Carqueiranne; Gilbert Vacquier, Marseille Cedex3; Daniel Lefevre, Aubagne, all of (FR)

(73) Assignee: Les Peintures Jefco, Marseille (FR)

( * ) Notice: Subject to any disclaimer, the term of this patent is extended or adjusted under 35 U.S.C. 154(b) by 0 days.

(21) Appl. No.: 08/836,939

(22) PCT Filed: Nov. 3, 1995

(86) PCT No.: PCT/FR95/01450

§ 371 Date: Jun. 13, 2000

§ 102(e) Date: Jun. 13, 2000

(87) PCT Pub. No.: WO96/15068

PCT Pub. Date: May 23, 1996

(51) Int. Cl.[7] .................. C04B 14/00; C04B 14/02; C10G 31/02
(52) U.S. Cl. ................ 106/479; 423/593; 423/626
(58) Field of Search ............... 106/479; 423/593, 423/606

(56) References Cited

U.S. PATENT DOCUMENTS

| 4,952,467 | A | * | 8/1990 | Buchel et al. | 429/112 |
| 4,957,725 | A | * | 9/1990 | Potember et al. | 423/592 |
| 5,427,763 | A | * | 6/1995 | Lawton et al. | 423/593 |
| 5,607,825 | A | * | 3/1997 | Carlson | 430/529 |
| 5,952,125 | A | * | 9/1999 | Bi et al. | 429/231.2 |
| 6,106,798 | A | * | 8/2000 | Kambe et al. | 423/592 |
| 6,130,007 | A | * | 10/2000 | Bi et al. | 429/231.2 |

OTHER PUBLICATIONS

Patent Abstracts of Japan, 1988, vol. 12 No. 50 (C–476) (2897), Feb. 16, 1988, referencing JP, A, 62 197317.
Derwent Publications Ltd., London, GB, 1977, DD, A, 126 414, Jul. 13, 1977.
Chemical Abstracts, vol. 112, No. 50, May 14, 1990 referencing Range et al.

* cited by examiner

*Primary Examiner*—Elizabeth D. Wood
(74) *Attorney, Agent, or Firm*—Wolf, Greenfield & Sacks P.C.

(57) ABSTRACT

Vanadium dioxide particles having formula $V_{1-x}M_xO_2$, wherein $0 \leq x \geq 0.05$ and M is a doping metal, and being characterized in that they have a particle size of less than 10 $\mu$m, a method for preparing same, and the use of said microparticles, in particular for surface coating, are disclosed.

19 Claims, 9 Drawing Sheets

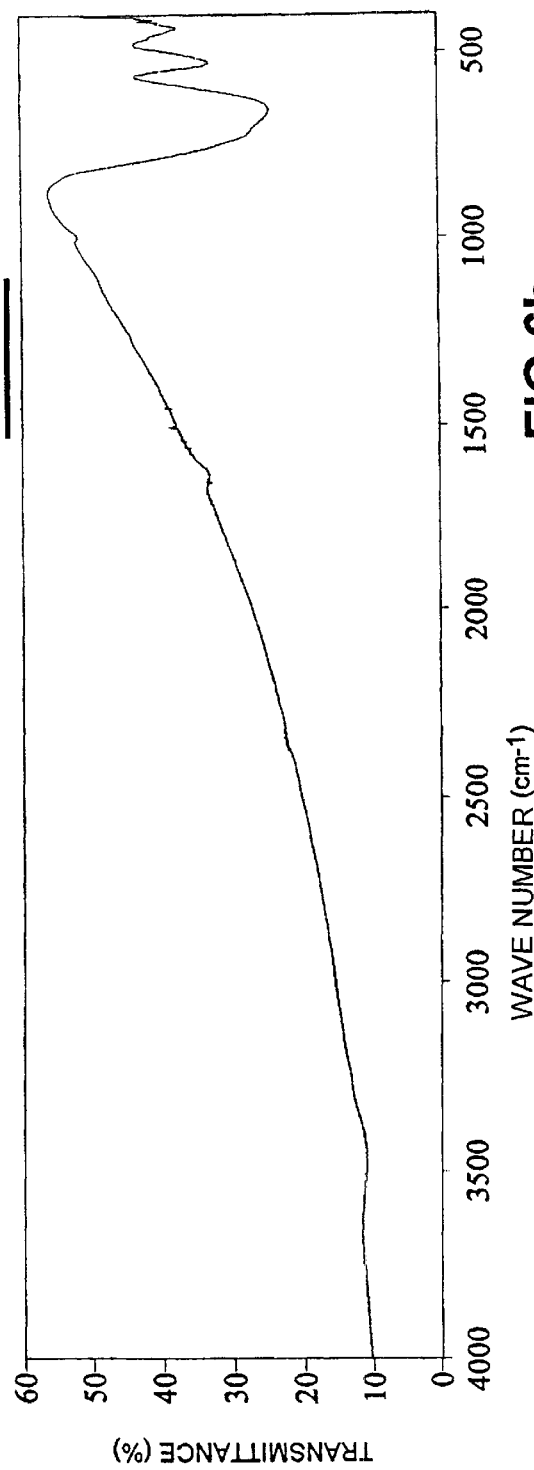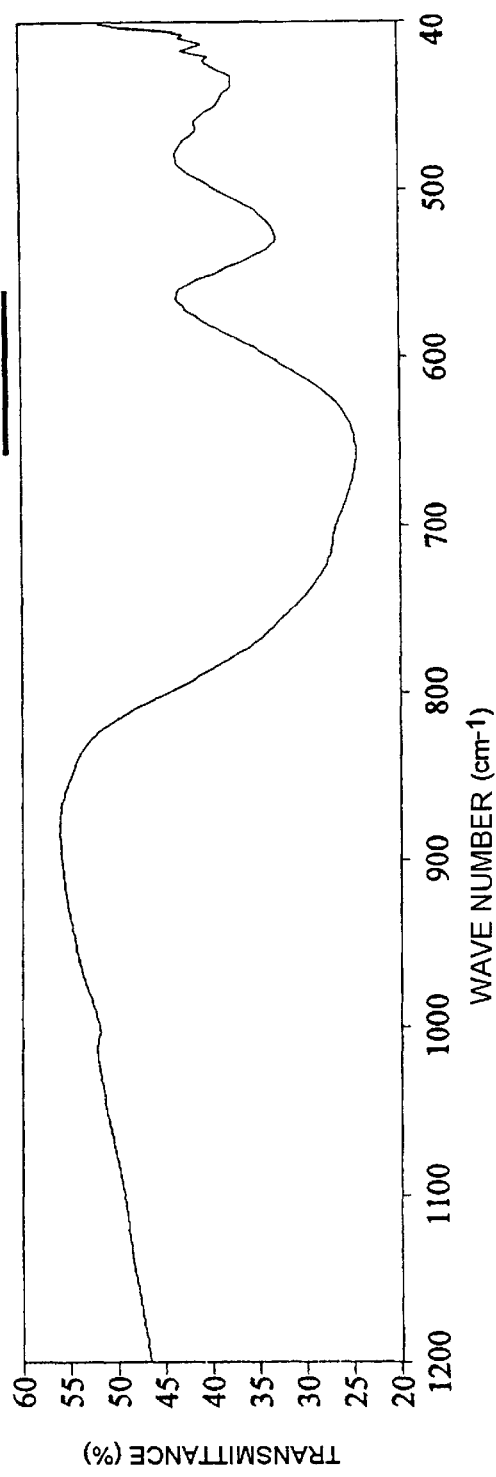

VANADIUM DIOXIDE MICROPARTICLES, METHOD FOR PREPARING SAME, AND USE THEREOF, IN PARTICULAR FOR SURFACE COATING

The object of the present invention is vanadium dioxide microparticles, a method for preparing said microparticles and their applications, notably for surface coatings in which they are incorporated.

In a first aspect, the invention relates to microparticles of vanadium dioxide of formula $V_{1-x}M_xO_2$ in which $0 \leq x \leq 0.05$ and M is a doping metal, said microparticles having a particle size of less than 10 μm, notably less than 5 μm, preferably in the order of 0.1 to 0.5 μm.

The doping metal may be selected from transition elements which offer an ionic beam greater than that of vanadium such as for example Nb or Ta or an electronic contribution such as for example Mo or W, W and Mo being preferred.

In a preferred aspect, the microparticles according to the invention are constituted of doped vanadium dioxide of formula $V_{1-x}W_xO_2$ in which x is between 0 and 0.02.

The vanadium dioxide microparticles according to the invention may notably be used in the technical sector of coating compositions intended to be essentially deposited in thin layers in the form of a film or a leaf, such as paints, varnishes and any other type of coating that may be deposited in successive layers.

The aim of the invention is therefore to use the vanadium dioxide microparticles described above for carrying out an <<intelligent>> material which automatically reduces the transmission of solar rays in the domain of infra-red rays, when the material reaches a given temperature level. It is thus possible to benefit from the energy of the infra-red rays below the fixed temperature and to eliminate the excessive heating above this temperature.

One of the principal applications of the vanadium dioxide microparticles according to the invention is their use in coatings intended to be affixed on the facades of buildings exposed to bad weather. The dark coloured coatings exposed to the sun's rays heat up much more than those of light colour. They therefore undergo expansion-contraction cycles of very high amplitude which cause a premature degradation of the coating sheet. It is therefore not possible at the present time to guarantee a dark paint whose luminous luminance is lower than 35%.

This phenomenon may be limited by the addition of a vanadium dioxide pigment to the paint whose fixed transition temperature should be in the order of 25° C. for example.

Another application is that of the protection of transparent or translucent surfaces which must allow visible rays to pass through them, such as in greenhouses, verandas, housing glazings, but whose internal temperature needs to be controllable, such a use may also be envisaged within the context of glazings and coachwork of cars and all other transport vehicles.

In summer, by reducing the entry of incident solar energy into buildings, the coating enables reducing the needs for air-conditioning and, on the other hand, in winter, the coating limits the dissipation of heat towards the exterior. Thus the coating advantageously allows an economy in energy.

One of the objects of the present invention is in fact the controllability of the transfer and the absorption of calorific energy at the surface of a wall without necessitating specifically transforming or treating the material thereof, but by depositing a coating following any known method, such as is practised with paints, it being possible for said coating according to the invention to be itself such a paint, enabling an economic implementation and manufacture.

Now, various ionic or molecular compounds are known which, under the effect of a variation of temperature, can change the optical properties, principally the colour, linked to a change of electronic structure: such compounds are called <<thermochromic>> compounds. By extension, a compound may also be called <<thermochromic>> which has the property of absorbing and/or reflecting different types of rays according to temperature due to a change in electronic structure. Vanadium dioxide has thus been studied for several years which has a structural transition at a temperature $T_t$=341 K or 68° C.: below $T_t$ the crystalline structure is monoclinic, whereas above T, the structure is rutile. This transition is associated with a sudden change in the electronic properties: the compound thus passes into the insulating state when the temperature is lower than $T_t$ and into the metallic state when the temperature is greater than $T_t$; optically, this change manifests itself as deep modifications of the near and far infra-red absorbance and reflection properties.

In the rest of the description, the designation <<vanadium dioxide>> shall comprise vanadium dioxide commonly named $VO_2$ or $V_2O_4$.

Various studies have recently been carried out on this compound, such as those that may be picked out in the publications S. M. Babulanam, Mat. Opt. Sol. Light Techn. 692 (1986) 8 and J. C. Valmalette, Sol. Energy Mater 33 (1994) 135. Studies have therefore been conducted on thin layers of vanadium dioxide deposited on various substrates: they have notably revealed the practical interest of the development of a material which is transparent to light but which only allows the infra-red part of the solar spectrum to pass through at low temperature. From this, the vanadium dioxide seems at the present time to be the only compound for which the transition is situated in a range of temperature and wavelengths suitable to the thermal regulation of the housing.

Moreover, this compound has the additional advantage of being able to undergo chemical substitutions with appropriate atoms such as defined further on and enabling a displacement of the temperature $T_t$ towards lower temperatures.

Thus, many tests and researches have been developed to create thin layers of vanadium dioxide deposited on substrates, notably with the view to studying the optical transmittance in the visible and the near infra red; for this, various depositing techniques have been envisaged, such as cathodic spraying under vacuum, evaporation under beam, vapour phase chemical deposits and the <<sol-gel>> process.

According to the <<sol-gel>> process, vanadium dioxide is prepared from tetravalent vanadium by dissolution in a solvent, hydrolysis and condensation in order to gradually form a sol, then, by evaporating the solvent, forming a gel which is then submitted to a thermal treatment to give $VO_2$, under a finely controlled atmosphere.

It is possible to directly form a $VO_2$ film on a substrate, by soaking an appropriate substrate in the sol. The gel is thus formed directly on the substrate. Such a process of moistening or <<dip-coating>> is notably described in the U.S. Pat. No. 4,957,725.

It is however difficult to control the quality of the final film deposited, i. e. to place the complete piece or even its surface at high temperature in a uniform way and to control the interactions between the support and the gel thus deposited, etc . . . Thus, on the one hand, such methods which do not apply to the materials already constituted do not really enable an application on very large surfaces such as can be done with a surface coating composition such as paint and, on the other hand, the results obtained are neither repetitive nor reliable. Moreover, it is a very costly process when it comes to large surfaces.

Processes via the dry route generally exist which are very long (in the order of fifteen days) and are therefore very costly, which only enable obtaining molecules-grains in the order of 30 microns and more, which is not compatible with an incorporation into a paint without modifying the colour of it, which does not allow a homogeneous mixture and which does not bring about the property of optical transmission.

The problem posed is therefore one of being able to obtain a powder of low particle size which essentially comprises vanadium dioxide which is doped or not notably with tungsten which may notably be able to be incorporated in a liquid or viscous support with the view to obtaining a surface coating.

In a second aspect, the invention therefore relates to a method of obtaining microparticles of vanadium dioxide of formula $V_{1-x}M_xO_2$ in which M is a doping metal and $0 \leq x \leq 0.02$, by pyrolysis of doped or non-doped ammonium hexavanadate, characterised in that said pyrolysis is carried out at a temperature between about 400° C. and about 650° C., with a temperature increase rate of at least 100° C./min, and in that the gases resulting from said pyrolysis are kept in confinement and in direct contact with the reaction medium for a period of time of at least ½ hour, preferably 1 hour.

The use of ammonium hexavanadate $(NH_4)_2V_6O_{16}$ is known in industry for the manufacture of $V_2O_5$ commonly used as catalyst, but in which the tetravalent vanadium is considered as a non-catalytic impurity whose removal is sought. The tests which have been able to be done with this precursor in order to also obtain vanadium dioxide alone have not led to anything since $V_2O_3$ was obtained and every publication up to the present day maintains that it was not possible to obtain pure vanadium dioxide.

The objects, advantages and features of this invention will be more clearly appreciated from the following detailed description, when taken in conjunction with the accompanying drawings, in which.

Figure 4A:
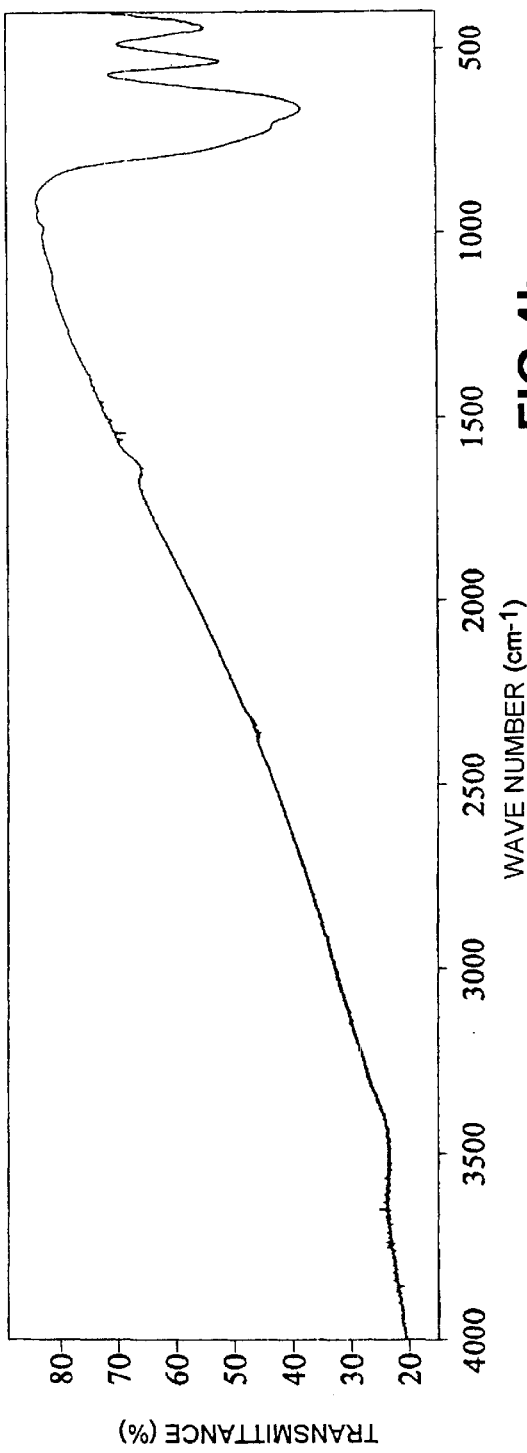
Figure 4B:
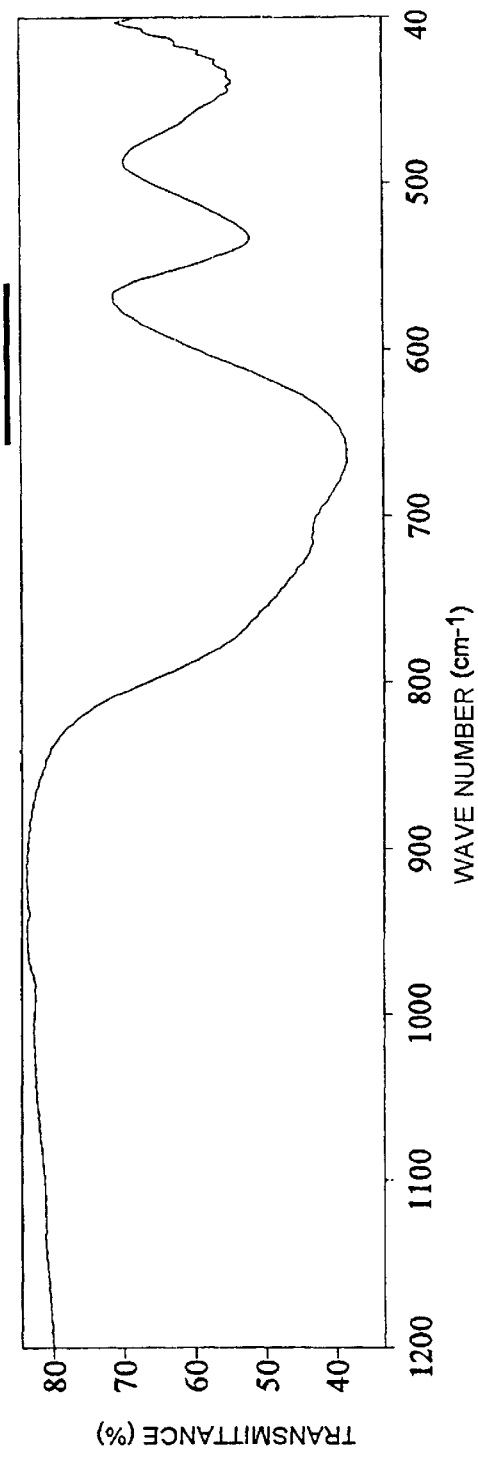
Figure 5:
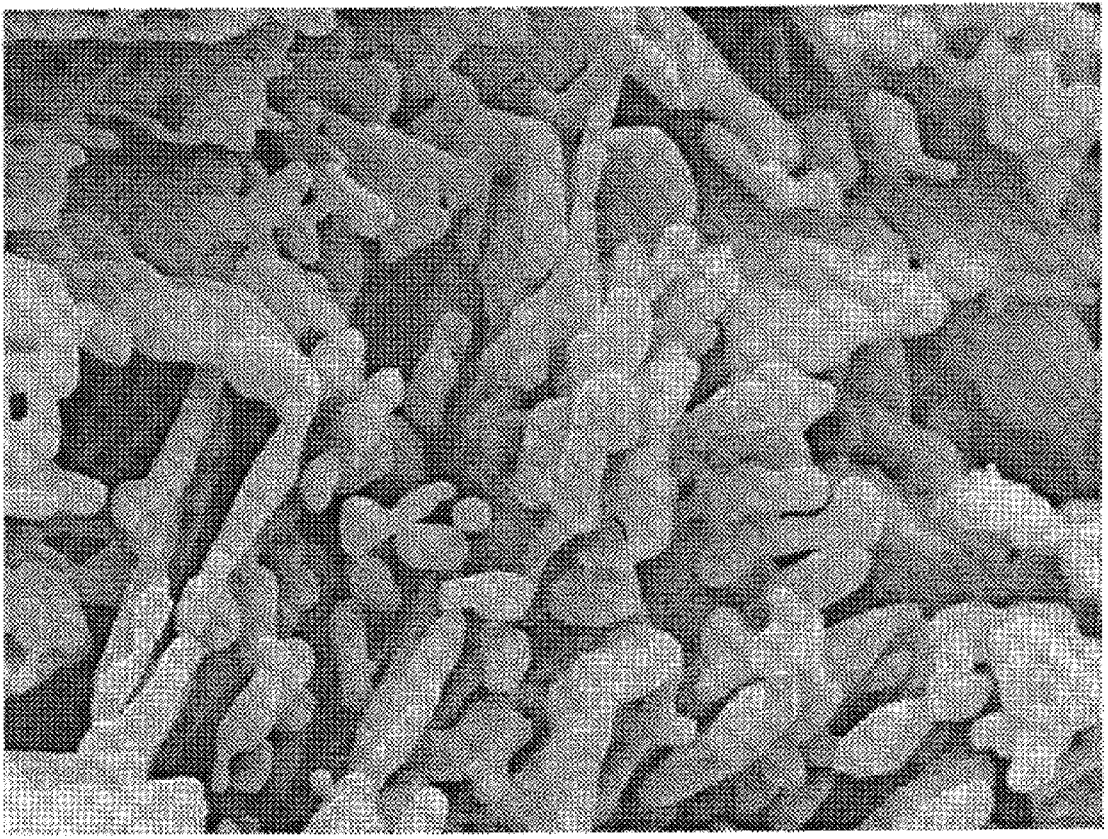
Figure 7:
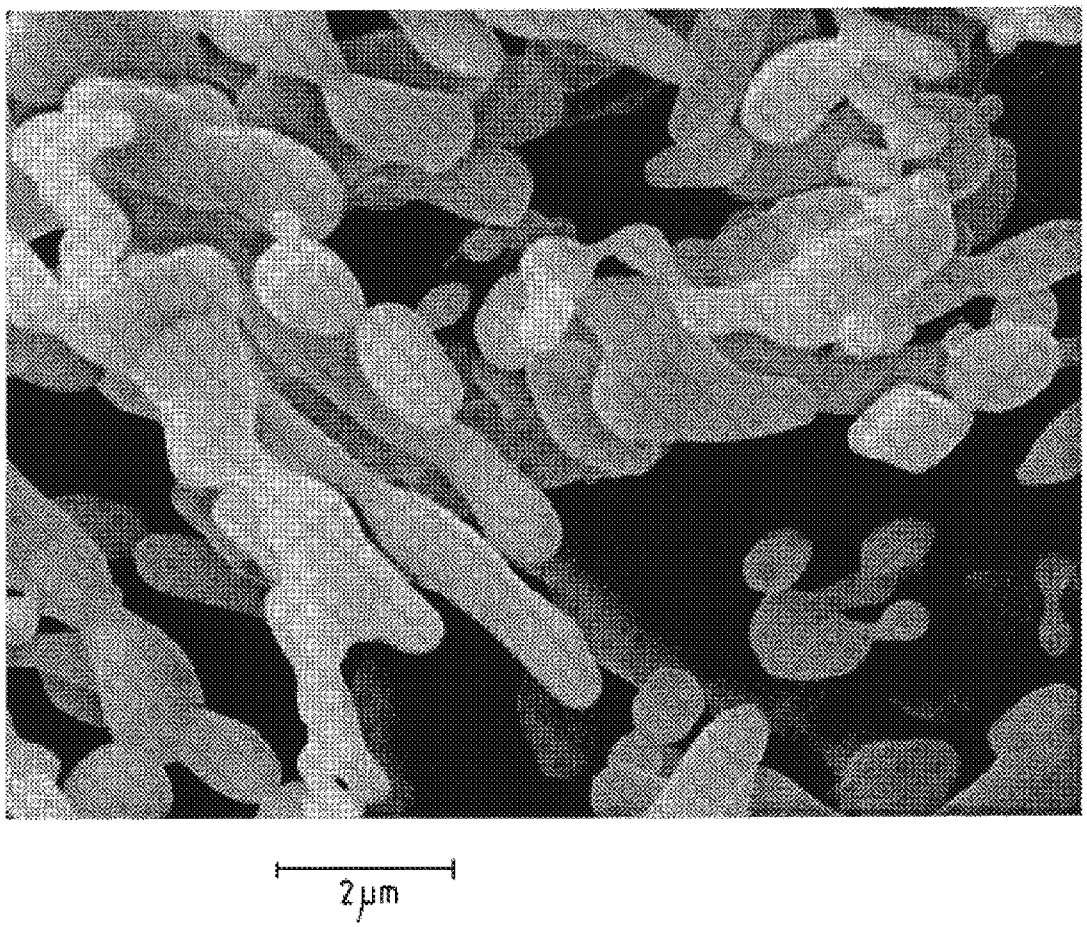
Figure 8A:
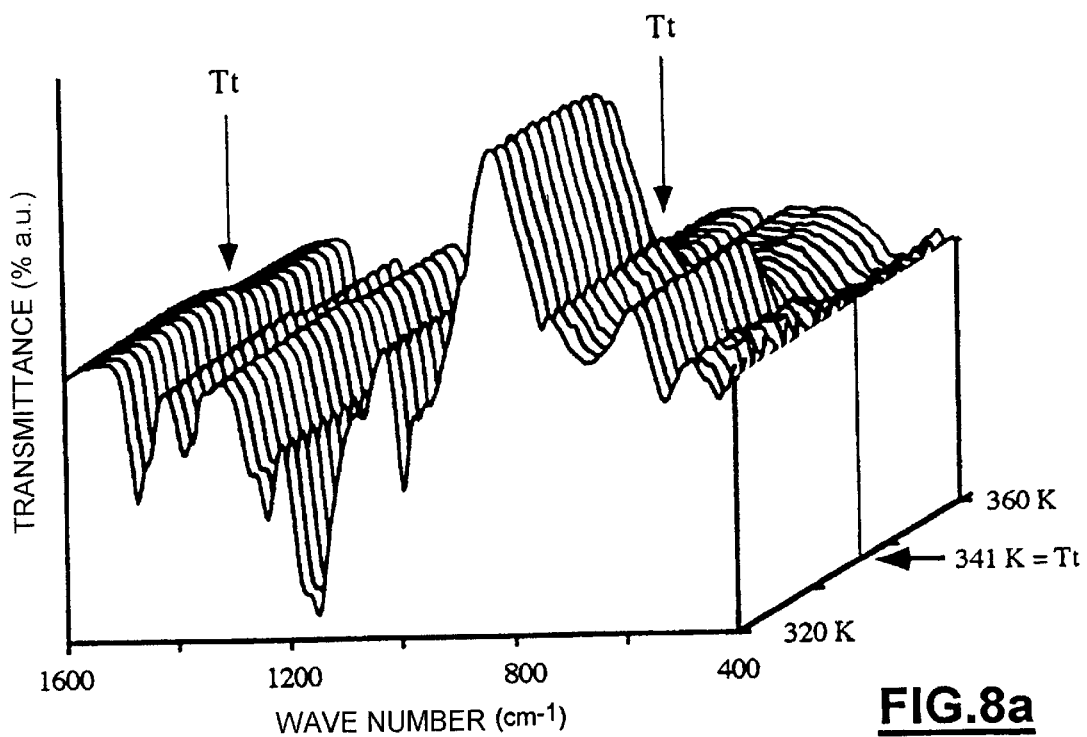
Figure 8B:
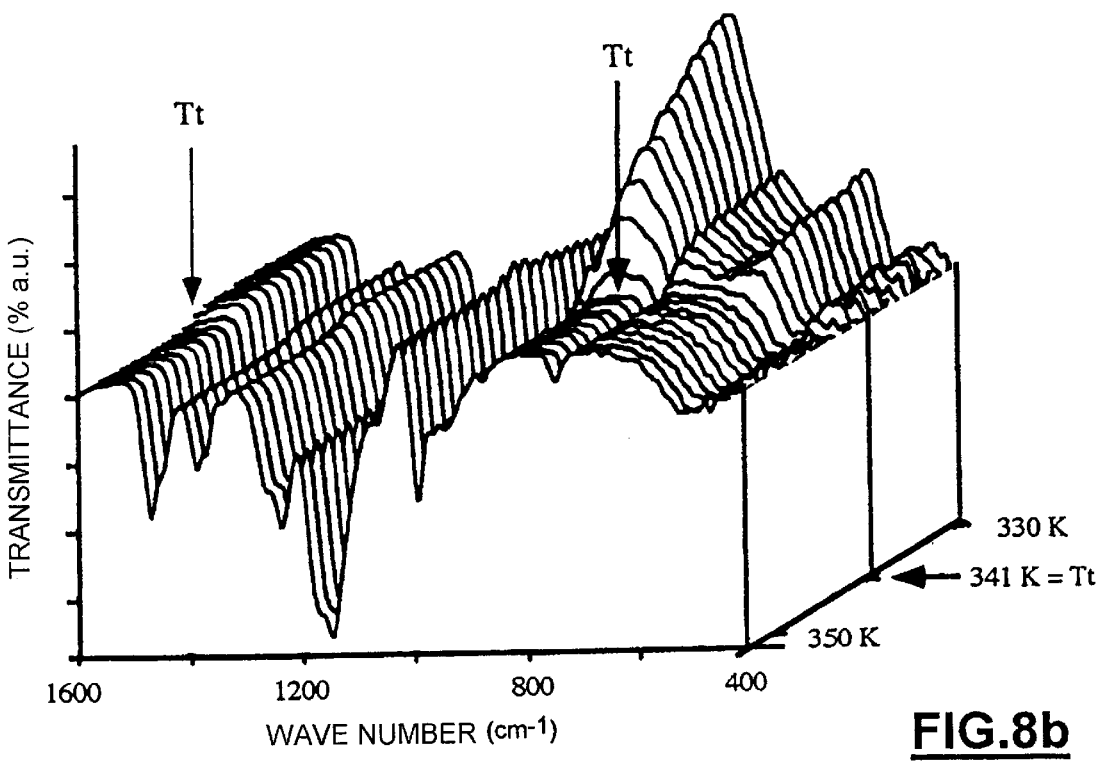
Figure 9:
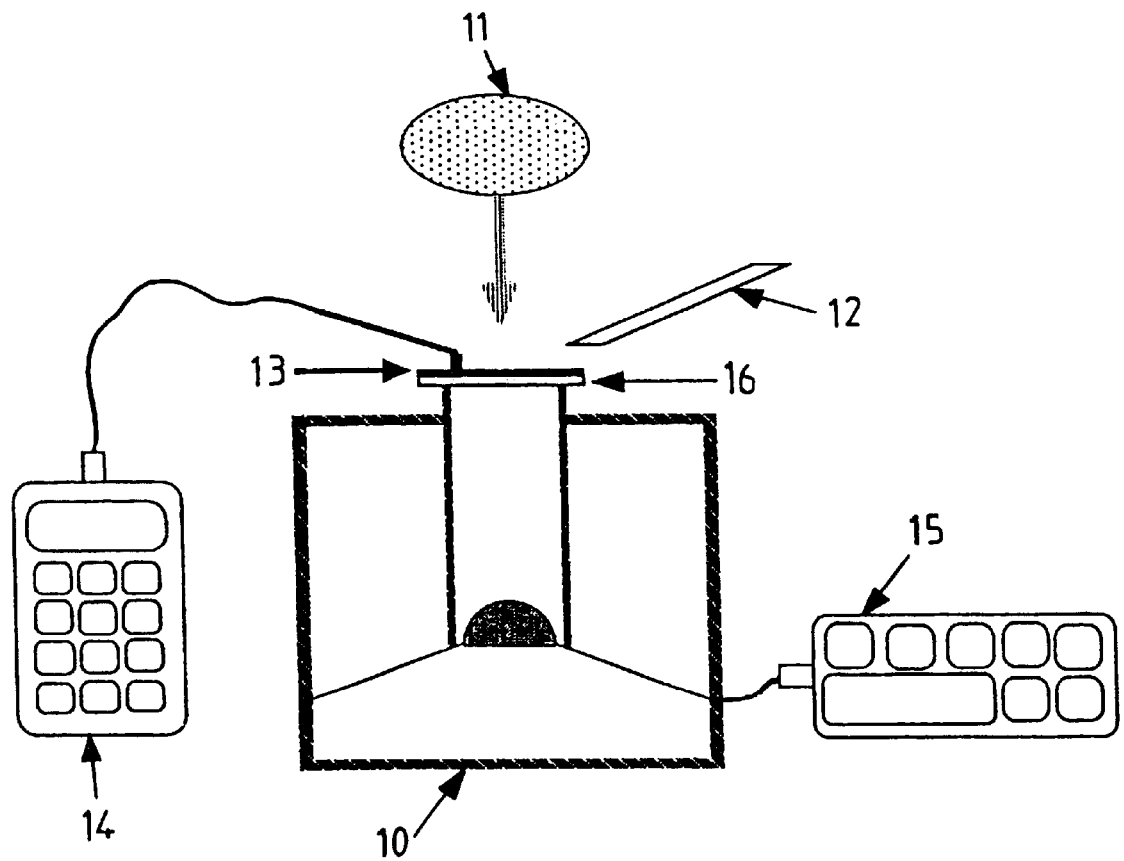

FIGS. 4a–b are infrared spectrographs of the product prepared in Example 1 recorded at a temperature that is above 68° C. (FIG. 4a) and below 68° C. (FIG. 4b);

FIG. 5 is a SEM photomicrograph of the product prepared in Example 1;

FIGS. 6a–b are Infrared spectrographs of the product prepared in Example 4 recorded at a temperature that Is above 68° C. (FIG. 6ae) and below 68° C. (FIG. 6b);

FIG. 7 is a SEM photomicrograph of the product prepared in Example 4;

FIGS. 8a–b are absorption spectra of the film prepared In Example 7 during heating (FIG. 8a) and during cooling (FIG. 8b); and FIG. 9 is a schematic diagram showing a device for measuring solar flux.

The implementation of the characteristic conditions of the method of pyrolysis according to the invention, namely:

a temperature increase rate of at least 100° C./min, preferably 200° C./min or 300° C./min, and the non-evacuation of the gases resulting from the thermal decomposition of ammonium hexavanadate, notably $NH_3$, which are kept in confinement and in contact with the reaction medium at least 5 minutes, preferably between ½ hour and 2 hours, and at the most throughout the whole duration of the synthesis, allows obtaining a complete reaction without any formation of residual $V_2O_5$ according to the following reaction scheme:

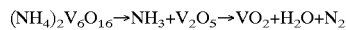

$(NH_4)_2V_6O_{16} \rightarrow NH_3 + V_2O_5 \rightarrow VO_2 + H_2O + N_2$

It has in fact been possible to notice that at a fast pyrolysis rate a <<flash>> reaction is created which produces $N_2O$ which slowly decomposes by reacting with excess $NH_3$ forming $H_2O$ and $N_2$.

Furthermore, to this day, in most existing ovens, either the reaction place is brushed out, carrying away the $NH_3$ gas produced and thus stopping the reduction which produces only $V_6O_{13}$ and does not allow going as far as vanadium oxide, $VO_2$, $V_2O_4$; or on the contrary other methods which add $NH_3$ by circulation, which creates too significant a reduction and leads the reaction to obtain $V_2O_3$ and a mixture of several vanadium oxides.

Advantageously, the gases resulting from the thermal decomposition of ammonium hexavanadate are collected in a gas bag under slight pressure, for example about 0.5 bar, placed preferably at a level higher than that of the reactor.

The pyrolysis temperature must be between about 400° C. and about 650° C., preferably 635° C. If the temperature is above about 650° C., the $V_2O_5$ present in the reaction medium risks melting before it reacts; On the other hand, a reaction temperature below about 400° C. leads to non-thermochromic $VO_2$ (B).

In the case of the preparation of doped vanadium dioxide particles, this duration must also be fixed in such a way as to obtain a doping homogeneity whilst preventing the growth of the grains by optimisation of the temperature-time compromise.

For example, for a doping rate of 5% W:

| temperature | 600° C. | 650° C. | 700° C. |
|---|---|---|---|
| minimum time | 116 hours | 3 hours | 1 hour |
| maximum time | 60 hours | 12 hours | 6 hours |

If it is desired to prepare vanadium dioxide microparticles having a structural transition temperature different from 68° C. (corresponding to pure vanadium oxide), it is necessary to dope it with a substitution product whose stable valency must be greater than 4.

In a preferred aspect, a metal selected from Nb, Ta, Mo and W will be used as substitution product, W and Mo being preferred.

Substitution with tungsten (W) allows obtaining a final product which has a significant temperature variation gradient as a function of percentage substitution: a significant gradient allows in fact covering quite a large range of temperatures. Thus, for examples of the value of x above, a transition temperature is obtained of:

| x = 0% | 1% | 2% | 3% |
|---|---|---|---|
| $T_t$ = 68° C. | 40° C. | 12° C. | −16° C. |

In a preferred aspect of the method, ammonium hexavanadate is therefore used which is doped with a metal selected from Nb, Ta, Mo and W, W and Mo being preferred.

In the following part of the description, <<doping by a metal>>, the metal being such as defined above, means doping carried out by using the metal in the pure form or in the form of a compound containing same, such as notably a tungstate or a molybdate.

The ammonium hexavanadate used in the method according to the invention is commercially available. It may also be prepared in a known manner from ammonium metavanadate.

When it is desired to prepare doped vanadium dioxide microparticles, either ammonium hexavanadate can be doped, or the doping metal can be incorporated during the synthesis of the hexavanadate from ammonium metavanadate.

The use of tungsten as substitution product is also advantageous insofar as the ammonium tungstate is very soluble in water.

Notably, when it is desired to incorporate tungsten into the ammonium hexavanadate already synthesised, the ammonium tungstate may easily be placed in solution in water with the ammonium hexavanadate, with a minimum of moistening of 20% by weight in order to obtain a homogeneous ground paste.

The chemical substitution or doping is thus carried out by pyrolysis of the mixture of the ammonium tungstate and hexavanadate precursors according to the following reduction and substitution reaction:

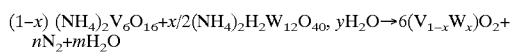

$(1-x) (NH_4)_2V_6O_{16}+x/2(NH_4)_2H_2W_{12}O_{40}, yH_2O \rightarrow 6(V_{1-x}W_x)O_2+ nN_2+mH_2O$ The choice of x for a homogeneous result is an exact stoichiometric calculation which enables obtaining the desired temperature variation with respect to the transition temperature of 68° C. of vanadium dioxide: it may be noted for this that the gradient $\delta_t/dx=-28$ in $10^2$ K/mole, be it in fact for x=0.01 or 1%, $\delta_t=-28°$ C.

According to an advantageous aspect of the method according to the invention, the ammonium hexavanadate is submitted before pyrolysis to a degassing at a temperature lower than the decomposition temperature of ammonium hexavanadate, notably lower than about 230° C., and preferably in the order of 200° C., and by carrying out a first pumping under vacuum for at least one minute, for example 15 minutes.

At the end of the pyrolysis, the vanadium dioxide obtained may advantageously be submitted to an annealing step under inert gas, at a temperature of at least 600° C., for a period of time of at least 1 hour, for example 5 hours.

For example, this annealing step may be carried out at 600° C. for 14 hours. At 800° C. for 5 hours, the grain growth is greater than 5 μm.

In a preferred aspect of the method according to the invention, and optionally after the above-mentioned annealing step, the vanadium dioxide will be cooled under inert gas to a temperature of about 120° C. The cooling rate may be for example about 150° C./min to 250° C./min.

Nitrogen or argon for example may be used as inert gas.

During the exit of the vanadium dioxide into the free air, the temperature must be at the most about 100° C. in order to prevent it taking up water and therefore risking surface re-oxidation.

Figure 1:
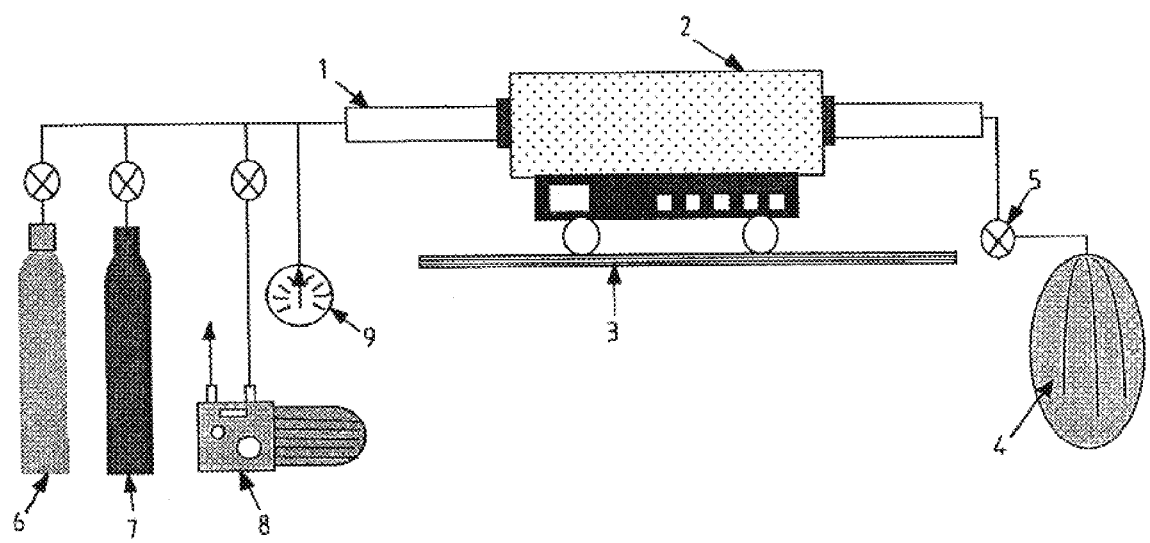
FIG. 1 is a schematic diagram showing an oven for carrying out one embodiment of the present invention.

An example of an oven which allows carrying out the method according to the invention is represented in FIG. 1 in which, as well as the assembly of a mobile tubular oven (2) on a rail (3) with respect to the treatment chamber (1) constituted of a quartz tube which enables obtaining the rapid rate of obtaining the temperature desired, is represented by a gas bag (4) which allows keeping the gases resulting from the thermal decomposition of ammonium hexavanadate, notably $NH_3$, in confinement above the grains to be treated in the chamber (1). This allows maintaining a partial ammonia pressure sufficient so that the reduction reaction to $VO_2$ be total. The heavier gas $N_2O$ is carried away towards the bottom in said gas bag (4), which allows increasing and optimising the purity of the compounds obtained.

The valve (5) which allows the eventual exit of the gases, the argon and nitrogen feeding cylinders (6) and (7), a vacuum pump (8) and the pressure indication dial (9) are also shown in FIG. 1.

Thus, according to the method of the invention, vanadium dioxide microparticles may be obtained which have a particle size lower than 10 μm, notably lower than 5 μm, preferably in the order of 0.1 to 0.5 μm.

Figure 2:
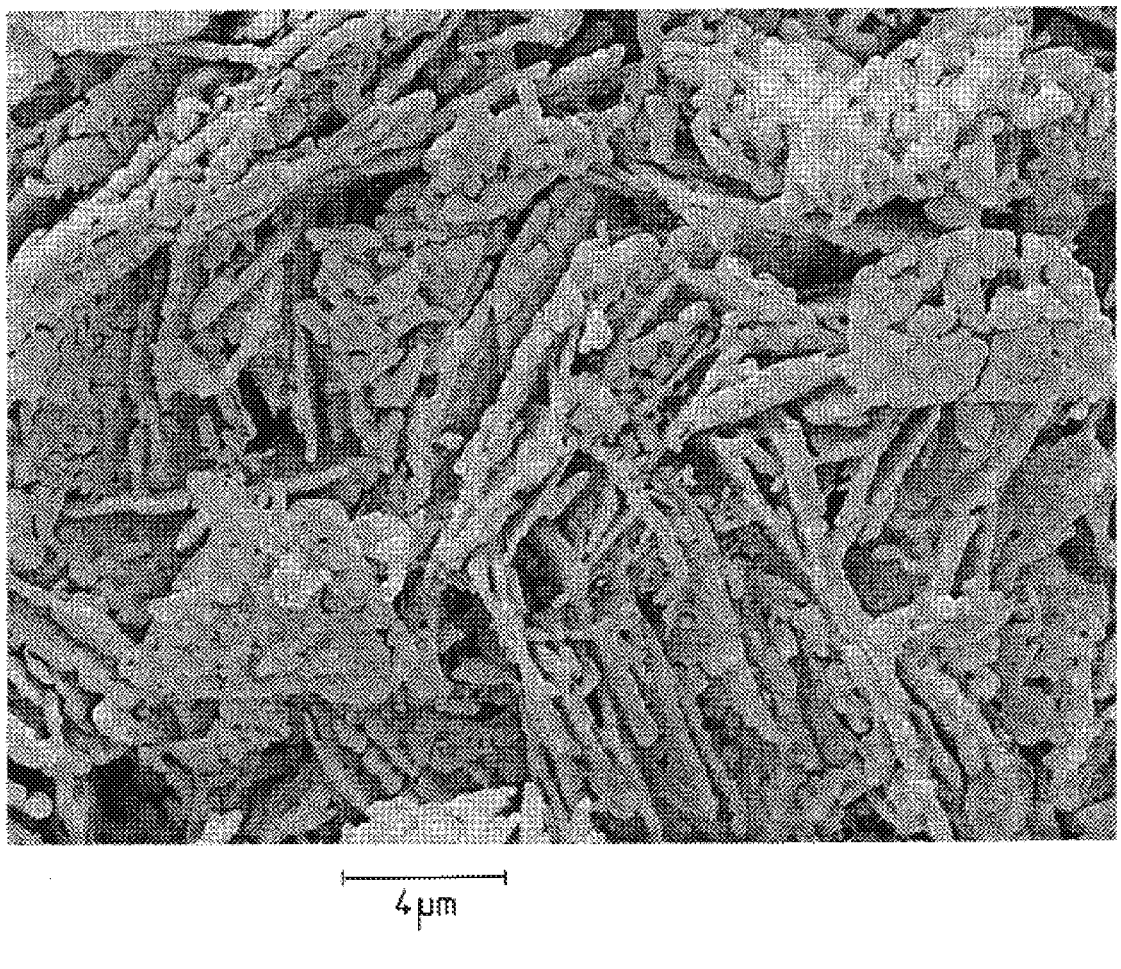
FIG. 2 is a SEM photomicrograph of grains prepared according to one embodiment of the present invention.

Certain grains may be from 2 to 10 μm after reaction but may be easily broken up by grinding; they are all in fact advantageously in the form of <<pre-cut>> platelets when they are prepared by the method of the present invention, as is shown by the sweeping electron microscope photograph (SEM) represented in FIG. 2, whilst in prior art methods, such as recalled above, even when pure vanadium dioxide is obtained, it is essentially a matter of massive monocrystals in the order of 30 μm which are very difficult to break up.

Thus, in a preferred aspect of the method, the vanadium dioxide obtained after pyrolysis, said pyrolysis optionally being followed by an annealing process and/or cooling process such as mentioned above, is submitted to a moist grinding. Said grinding may be carried out for example in a spinning zircon ball grinder at more than 3000 turns/min for a period of time of less than or equal to 2 hours.

Thus, after treatment by grinding, immediately or afterwards, in the context of its incorporation in a surface coating composition of vanadium dioxide obtained according to the invention, the whole of it may be brought up to a range of particle size of 0.1 to 0.5 μm: such base particles enable obtaining then a transparent film which responds to the objectives sought-after and satisfy the applications of the invention, either by mixing with a paint coloured by any pigment, without significantly changing the colour, or by incorporating into a varnish in keeping the transparency thereof.

In a subsequent aspect, the invention therefore relates to the use of the vanadium dioxide microparticles according to the invention for the preparation of surface coating compositions.

The incorporation of vanadium dioxide in the surface coating composition, notably a paint or a varnish, may be by any known method such as impasting, introduction with stirring, of the doped or non-doped vanadium dioxide and a dispersing agent to help its dispersion and to stabilise it in this form. A grinding is optionally carried out to reduce the size of the particles, such as for example in a spinning zircon ball grinder spinning at more than 3,000 turns per minute for 2 hours, which allows breaking the vanadium dioxide microparticles up which would eventually be bigger than 0.1–0.5 μm, said grinding being carried out, as mentioned above, on the vanadium dioxide before incorporation into the surface coating composition.

In a subsequent aspect, the invention also relates to surface coating compositions which contain vanadium dioxide microparticles described in the present application.

The invention is illustrated by the Examples below which are in no way limiting.

EXAMPLE 1

Synthesis of Non-doped Vanadium Dioxide

I. Production of the Ammonium Hexavanadate Precursor (AHV)

20 g of ammonium metavanadate (AMV) (Aldrich Ref. 20,555 9; purity: 99%; M: 116.78) are introduced into a 250 ml beaker. The beaker is placed on a heating plate. A few drops of water are added with stirring so as to form a fluid paste in order to initiate the dissolution of the AMV. The beaker is heated at 55° C. ±5° C. in maintaining stirring. A 1N solution of hydrochloric acid is then added dropwise (at the start) whist stirring and keeping the temperature constant.

The pH is checked in order to regulate the rate of acid addition and to prevent sudden drops in pH. The total duration of this step is greater than a half hour.

For a volume of acid added of about 110 cm$^3$ (about 2 moles of acid for 3 moles of AHV), the pH drops suddenly without coming back up. Beyond this, the pH reaches a limiting value, the product obtained is a yellow orange paste, the addition of 1N hydrochloric acid may cease after 120 cm$^3$.

The yellow orange precipitate obtained is then rinsed with water (slightly acidic to prevent re-dissolution) in a filter crucible of No. 5 porosity by drawing under vacuum, then dried in air at 200° C. in an oven for 24 hours. 17 g of AHV are obtained.

Weight yield (expressed with respect to the initial mass of AMV)= molar yield (expressed in moles of vanadium): greater than 99%

II Pyrolysis of the Precursor a. Prior degassing of the AHV:

2 g of AHV are deposited in an aluminium basket in zone A (T=200° C.) of the oven. A first pumping under vacuum is carried out for 15 minutes.

b. Thermal decomposition of the AHV and formation of $VO_2$.

The basket is then placed directly in the second zone (B) of the oven wherein the temperature is 600±5° C. (temperature increase rate of about 250° C./min.).

The whole of the gases emitted is recovered in a gas bag under slight pressure of 0.5 bar in direct contact with the reactor and placed at a height lower than that of the reactor for 1 hour.

c. Cooling and exit from the oven:

The cooling in zone C of the oven is carried out in an atmosphere resulting from the decomposition to a temperature of 120° C. at a rate of about 200° C./min.

Mass of bluish-black powder ($VO_2$) formed: 1.6680±0.0005 g.

Figure 3:
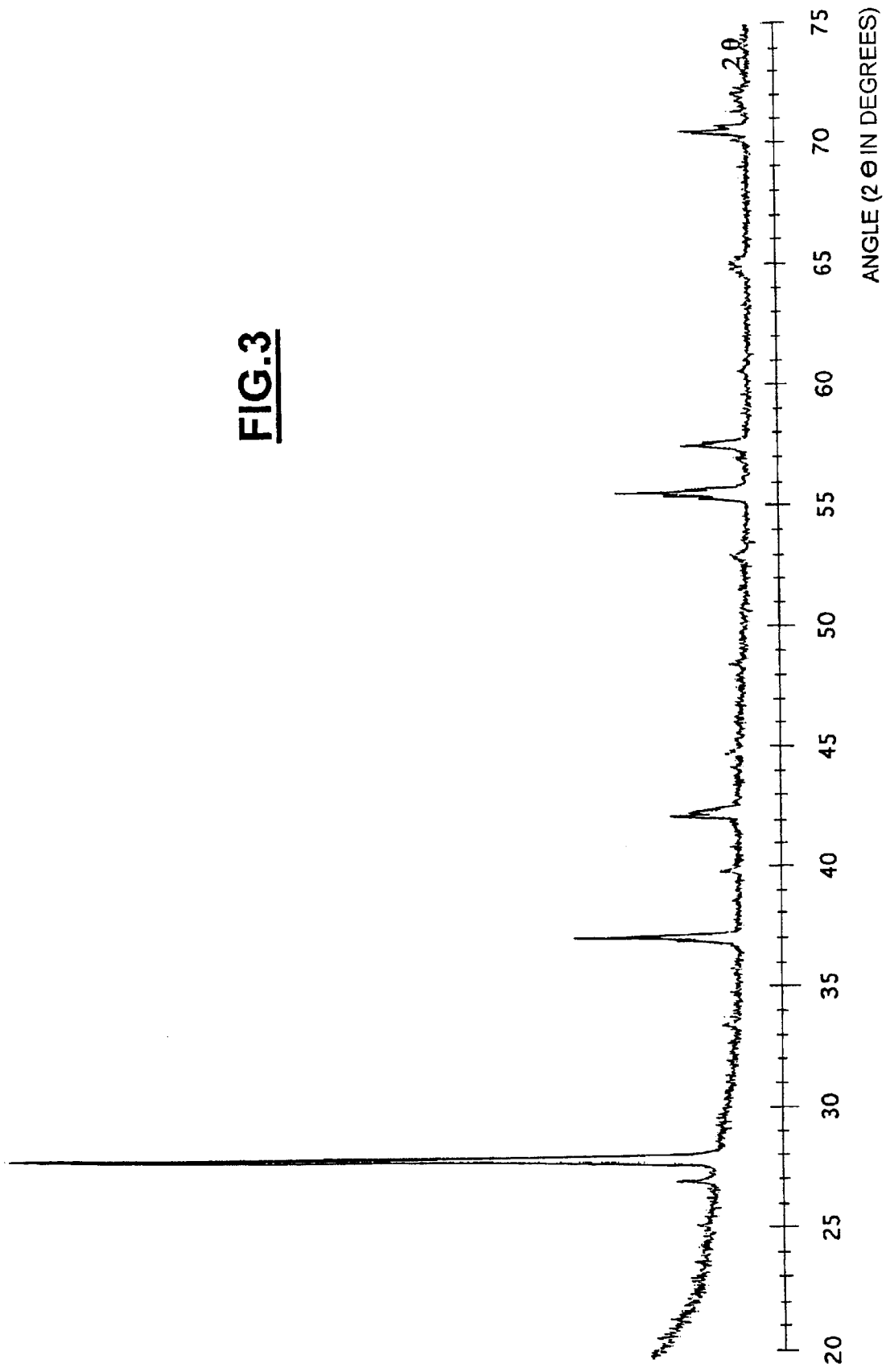
FIG. 3 is an x-ray spectrograph of the product prepared in Example 1.

The X-ray spectrum, the IR spectrum and the sweeping electron micrograph (SEM) of the product of Example 1 are represented in FIGS. 3, 4 and 5, respectively. In FIG. 4a, the IR spectrum is recorded at a temperature above 68° C. and in FIG. 4b, the IR spectrum is recorded at a temperature below 68° C.

EXAMPLE 2

Synthesis of Non-doped Vanadium Dioxide from an Industrial AHV Precursor a. Prior degassing of the AHV:

2 g of AHV (Treibacher (Austria), Ref. AHV Trocken 99%) in an aluminium basket in zone A of the oven (T=200° C.). A first pumping under vacuum is carried out for 15 minutes.

b. Thermal decomposition of the AHV and formation of $VO_2$:

The basket is then placed directly in the second zone (B) of the oven wherein the temperature is 600±5° C. (temperature increase rate about 250° C./min.).

The whole of the gases emitted is recovered in a gas bag under slight pressure and in direct contact with the reactor and placed at a height lower than that of the reactor for 1 hour.

c. Annealing of the vanadium dioxide:

The sample was left for 14 hours at 600±5° C. in the reactor in the presence of the decomposition gases.

d. Cooling and exit from the oven:

The cooling was carried out in the atmosphere resulting from the decomposition to a temperature of 120° C. at a rate of about 200° C./min.

Mass of bluish-black powder ($VO_2$) formed: 1.6689±0.0005 g.

EXAMPLE 3

Synthesis of Non-doped Vanadium Dioxide from an Industrial AHV Precursor

An industrial AHV precursor (Treibacher (Austria) Ref. AHV Troken 99%) is used.

a and b. The degassing and the thermal decomposition of the AHV are carried out as indicated above in Example 2.

c. Annealing of the vanadium dioxide:

The sample was taken out and then put back in the reactor in zone A (T=200° C.). The whole was then first placed under vacuum for 15 minutes. The sample was then displaced in the zone B of the oven at the temperature of 800° C. for 5 hours.

d. Cooling and exit from the oven:

The cooling in zone C of the oven was carried out in the atmosphere resulting from the decomposition to a temperature of 120° C. at a rate of about 200° C./min.

Mass of bluish-black powder ($VO_2$) formed: 1.6682±0.0005 g.

EXAMPLE 4

Synthesis of Doped Vanadium Dioxide of Formula $V_{1-x}M_xO_2$, with x=0.01 and M=W I. Production of the AHV Precursor with Doping Agent The AHV precursor is prepared as indicated above in Example 1, but by adding 0.459 g of ammonium tungstate (Aldrich Ref. 32,238.5; purity: 99%; M=265.88) before the addition of 1N hydrochloric acid.

The mass of product obtained is 19.424 g (including ammonium chloride). The product is characterised by an X-ray diffraction diagram and FTIR: very weak bands due to the tungstate in addition to that of AHV.

II. Pyrolysis of the Precursor a. Prior degassing of the doped AHV.

2.000 g of doped AHV prepared above are deposited in an aluminium basket in zone A (T=200° C.) of the oven. A first pumping under vacuum is carried out for 15 minutes.

b. Thermal decomposition of the doped AHV and formation of $VO_2$ doped with tungsten.

The basket is then placed directly in the second zone (B) of the oven wherein the temperature is 600±5° C. (temperature increase rate of about 250° C./min.).

The whole of the gases emitted is recovered in a gas bag under slight pressure and in direct contact with the reactor and placed at a height lower than that of the reactor.

c. Annealing of the vanadium dioxide.

The sample was left at 600° C. for 14 hours.

d. Cooling and exit from the oven.

The cooling in zone C of the oven was carried out in the atmosphere resulting from the decomposition to a temperature of 120° C. at a rate of about 200° C./min.

Mass of bluish-black powder ($VO_2$) formed: 1.669±0.001 g.

The IR spectrum and SEM photograph of the product of Example 4 are represented in FIGS. 6 and 7 respectively. In FIG. 6a, the IR spectrum is recorded at a temperature above 68° C. and in FIG. 6b, the IR spectrum is recorded at a temperature below 68° C.

EXAMPLE 5

Synthesis of Doped Vanadium Dioxide of Formula $V_{1-x}M_xO_2$, with x=0.01 and M=W, from an Industrial AHV Precursor I. Incorporation of the Doping Agent 20 g of AHV are introduced in a grinder in 25 ml of water in order to form a viscous paste. The paste is then submitted to a first grinding whose aim is to homogenise the dispersion of the AHV in the aqueous medium.

Ammonium tungstate is a white powder soluble in water. 0.539 g of it are added to the grinding paste and the dispersion is continued for several minutes.

The mixture thus obtained is dried under vacuum or in an oven at 200° C.

II. Pyrolysis of the Doped AHV Precursor

The pyrolysis is carried out under the same implementation conditions as in Example 2 above, in carrying out the annealing step for 5 hours at 800° C.

Mass of bluish-black powder ($VO_2$) formed: 1.670±0.001 g.

EXAMPLE 6

Synthesis of Doped Vanadium Dioxide of Formula $V_{1-x}M_xO_2$, with x=0.02 and M=W I. Incorporation of the Doping Agent Carried out as indicated above in Example 5 from 20 g of AHV (Treibacher, Austria, Ref. AHV Troken 99%). The mass of ammonium tungstate incorporated is 1.089 g.

II. Pyrolysis of the Doped AHV Precursor

The pyrolysis is carried out under the same implementation conditions as in Example 5 above.

Mass of bluish-black powder ($VO_2$) formed: 1.671±0.001 g.

EXAMPLE 7

Characterisation of the Films and Optical Measurements.

Dry films have been prepared which contain $VO_2$ doped or not with 1% tungsten ($V_{1-x}M_xO_2$ with x=0.01 and M=W) (solvent phase) in the following manner:

1) Preparation of the Varnish
   Empirical formula of the varnish

| | |
|---|---|
| Plexigum P675 (HULS, Germany) | 34 (Acrylic copolymer) |
| Solvanter S340 (Elf, France) | 28 Hydrocarbon solvent 100% aromatics |
| White spirit 17% (Elf, France) | 38 Hydrocarbon solvent 17% aromatics |
| | 100.00 |

Solvantar S340 and White Spirit 17% are weighed out into a beaker, then the Plexigum P675 is added with stirring and then left to stir until perfect homogenisation.

2) In Corporation of the $VO_2$ 100 g of varnish are weighed out into a beaker. 1 g of $VO_2$ (doped or not) are the added with stirring. Stirring is continued at 1500 turns/minute for at least 15 minutes until perfect homogenisation. The grinding is carried out with the aid of a glass microball grinder.

3) Application

The coating thus obtained is applied onto a glass plate with the aid of a manual applicator which enables the deposit of a thickness of 50 μm humid.

Drying is carried out at ambient temperature.

These films were characterised by the following techniques:

FTIR spectroscopy optical measurements by light-measuring (measurement of solar flux).

4) Results a. Characterisation of the transition by FTIR spectroscopy.

The free films are prepared by application on glass, drying and unsticking of the substrate.

The free films were characterised by FTIR in transmission and in ATR (Attenuated Total Reflection). The insulating-metal transition of the dioxide was clearly demonstrated during the heating and cooling by the disappearance and the reappearance of the absorption bands due to $VO_2$ at $T_t=66±2°$ C. for the film which contains non-doped $VO_2$ and at $T_t=±2°$ C. for a film which contains $VO_2$ doped with 1% tungsten.

FIGS. 8a and 8b affixed represent the three-dimensional evolution of the absorption bands during the heating of the film (FIG. 8a) then cooling (FIG. 8b) for a film which contains non-doped $VO_2$. It may be observed that only the bands of the polymer remain unchanged.

b. Sweeping electron microscopy.

The SEM has enabled on the one hand to characterise the distribution of the grains of $VO_2$ in the dry film, on the other hand, to carry out a precise measurement of the thickness.

c. Optical measurement by light-measuring.

A device represented in FIG. 9 for measuring the solar flux was specially created in order to demonstrate the thermochromic transition of the films in the near infra-red band. The principle has been the subject of a publication in an international review (J. C. Valmalette et al., Solar Energy Materials, 1994).

The artificial solar source (11) is constituted of a 50W halogen lamp whose emission maximum is centred on 1 μm. The samples are composite films or coatings (13) of 58 mm diameter deposited on a glass substrate (16) placed against a source (11) and the detector (10) which measures the luminous flux for wavelengths between 0.3 and 2.8 μm. The multimeter (15) measures the voltage delivered by the detector (10). Each sample may be heated or cooled by an air flow (12) and the temperature of the film is measured with the aid of a thermocouple linked to the thermometer (14).

The exploitation of the experimental results allows having access to three optical scales directly linked to the method of manufacture of the film and to the quality of the transition.

The characterisation of each of the films comprises:
- a direct measurement of the radiation of the source (without samples),
- a standardisation from a semi-opaque film which comprises a non-thermo-chromic black pigment by a high and low temperature measurement.
- a measurement on a glass plate alone I°
- a measurement of the cold film (T<$T_t$): $I_{cold}$
- a measurement of the hot film (T>$T_t$): $I_{hot}$.

Three scales have been defined by the calculation (in the solar spectral range of the detector):
- the opacity
- the relative efficiency (1−($I_{hot}/I_{cold}$) expressed in %
- and the absolute efficiency ($I_{hot}-I_{cold}$) in standard units: $W.m^{-2}$.

The results obtained are the following (the values of flux transmitted in the cold are expressed as a function of an incident radiation of 1,000 $W.m^{-2}$).

Dry film of 10 μm thickness which contains a mass fraction of non-doped $VO_2$ equal to M. F.=0.01.
opacity=34±2%
Flux transmitted in the cold (T<$T_t$=66° C.)=662 $W.m^{-2}$
transmitted in the hot (T>$T_t$=66° C.)=606 $W.m^{-2}$
Relative efficiency=8.5%
Gain in absolute efficiency=56 $W.m^2$ Dry film of 10 μm thickness which contains a mass fraction of non-doped $VO_2$ equal to M. F.=0.025.
opacity=40±2%
Flux transmitted in the cold (T<$T_t$=66° C.)=631 $W.m^{-2}$
Flux transmitted in the hot (T>$T_t$=66° C.)=527 $W.m^{-2}$
Relative efficiency=16.5%
Gain in absolute efficiency=104 $W.m^{-2}$ Dry film of 10 μm thickness which contains a mass fraction of non-doped $VO_2$ equal to M.F.=0.05.
opacity=63%
Flux transmitted in the cold (T<$T_t$=66° C.)=270 $W.m^{-2}$
Flux transmitted in the hot (T>$T_t$=66° C.)=186 $W.m^{-2}$
Relative efficiency=31.1%
Gain in absolute efficiency=84 $W.m^{-2}$ Dry film of 100 μm thickness which contains a mass fraction of $VO_2$ doped with 1% tungsten equal to M.F.=0.005±0.001.
opacity=68±2%
Flux transmitted in the cold (T<$T_t$=66° C.)=708 $W.m^{-2}$
Flux transmitted in the hot (T>$T_t$=66° C.)=635 $W.m^{-2}$
Relative efficiency=31.1%
Gain in absolute efficiency=73 $W.m^{-2}$ These results show that the volume fraction of pigment has a direct incidence upon:
- the thermal gain during their transition,
- the opacity of the varnish sheet.

EXAMPLE 8

Particle Size Study

This study was carried out by counting on an electron microscope on several samples of films made with non-doped $VO_2$ obtained according to Examples 1 and 2. The films were prepared according to the method of Example 7.

The results are given in Tables 1 and 2 below.

TABLE 1

Films containing non-doped $VO_2$ according to Example 1
.normal log distribution centred on D* = 0.3 μm with a standard deviation
Ln σ = 60
.film thickness = 10 μm
.volume fraction (volume of the pigment/total volume of the film) = 0.02

| Population | Sizes (microns) D | % of the total population | Average size D (microns) |
|---|---|---|---|
| A | <0.16 | 0.158 | 0.1 |
| B | 0.16–0.55 | 0.684 | 0.3 |
| C | >0.55 | 0.158 | 1 |

D = diameter of the particles; D = average diameter of the particles

TABLE 2

Films containing non-doped $VO_2$ according to Example 2
.normal log distribution centred on D* = 1 μm with a standard deviation
Ln σ = 0.8
.film thickness = 10 μm
.volume fraction (volume of the pigment/total volume of the film) = 0.02

| Population | Sizes (microns) D | % of the total population | Average size D (microns) |
|---|---|---|---|
| A | <0.2 | 23 | 0.17 |
| B | 0.2–0.45 | 13.6 | 0.30 |
| C | 0.45–1 | 34.2 | 0.67 |
| D | 1–2.23 | 34.2 | 1.5 |
| E | 2.23–5 | 13.6 | 3.34 |
| F | >5 | 23 | 5.85 |

D = diameter of the particles; D = average diameter of the particles

What is claimed is:

1. Microparticles of vanadium dioxide of formula $V_{1-x}M_xO_2$ in which 0<x<0.05 and M is a doping metal, according to which said microparticles have a particle size of between about 0.1 μm to about 0.5 μm.

2. Microparticles according to claim 1 of formula $V_{1-x}M_xO_2$ in which M is a metal selected from the group consisting of Nb, Ta, Mo and W.

3. Microparticles according to claim 1 of formula $V_{1-x}W_xO_2$ in which x is between 0 and 0.02.

4. A method for obtaining particles of vanadium dioxide of formula $V_{1-x}M_xO_2$ in which M is a doping metal and 0≦x≦0.05, by pyrolysing doped or non-doped ammonium hexavanadate, according to which said pyrolysis is carried out at a temperature between about 400° C. and about 650° C., with a temperature increase rate of at least 100° C./minute, and in that the gases resulting from said pyrolysis are kept in confinement and in direct contact with the reaction medium for a period of time of at least ½ hour.

5. The method according to claim 4, said method being carried out with ammonium hexavanadate doped with a metal selected from the group consisting of Nb, Ta, Mo and W.

6. The method according to claim 4, according to which the temperature increase rate is at least 200° C./minute.

7. The method according to claim 4, according to which the duration of the confinement of the gases resulting from the pyrolysis is at least 5 minutes.

8. The method according to claim 4, according to which, before pyrolysis, the ammonium hexavanadate is submitted to a degassing at a temperature below 230° C. and in carrying out a first pumping under vacuum for at least 1 minute.

9. The method according to claim 4, according to which, after the pyrolysis, the vanadium dioxide obtained is submitted to an optional annealing step under inert gas at a temperature of at least 600° C. for a period of time of at least 1 hour.

10. The method according to claim 4, according to which, after the pyrolysis the vanadium dioxide is cooled under inert gas to a temperature of about 120° C.

11. The method according to claim 4, according to which the vanadium dioxide obtained is optionally submitted after the pyrolysis, said pyrolysis being optionally followed by an annealing step and a cooling step to a grinding.

12. Surface coating compositions which contain microparticles according to claim 1.

13. The method according to claim 4 wherein the period of time is one hour.

14. The method according to claim 6 wherein the temperature increase rate is at least 300° C. per minute.

15. The method according to claim 7 wherein the duration of the confinement of the gases is between one half hour and two hours.

16. A method for preparing a surface coating composition comprising incorporating microparticles of vanadium dioxide of formula $V_{1-x}M_xO_2$ in a mixture comprising a pigment or a varnish, in which $0<x<0.05$ and M is a doping metal, and in which said microparticles have a particle size of between about 0.1 $\mu$m to about 0.5 $\mu$m.

17. The microparticles of claim 1, wherein the microparticles are substantially transparent.

18. The surface coating composition of claim 12, wherein the microparticles do not significantly change the color of the surface coating composition.

19. The surface coating composition of claim 12, wherein the microparticles do not significantly change the transparency of the surface coating composition.

* * * * *